Nov. 8, 1960 C. HILL 2,959,237
FOUR WHEEL DRIVE FOR AUTOMOTIVE VEHICLES
Filed July 19, 1957 3 Sheets-Sheet 1
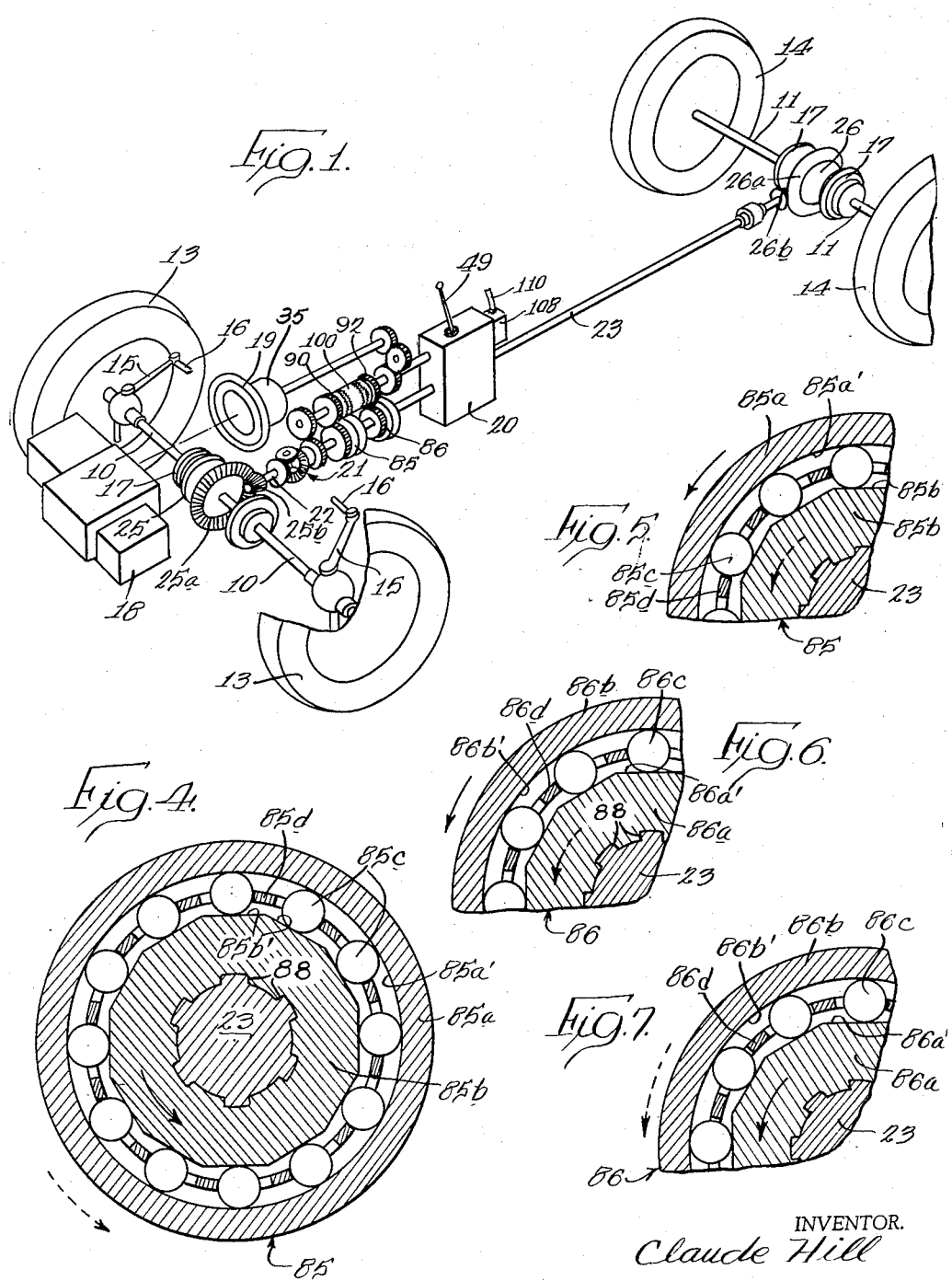
INVENTOR.
Claude Hill
BY
Carlson, Pitzner, Hubbard & Wolfe
Attys.

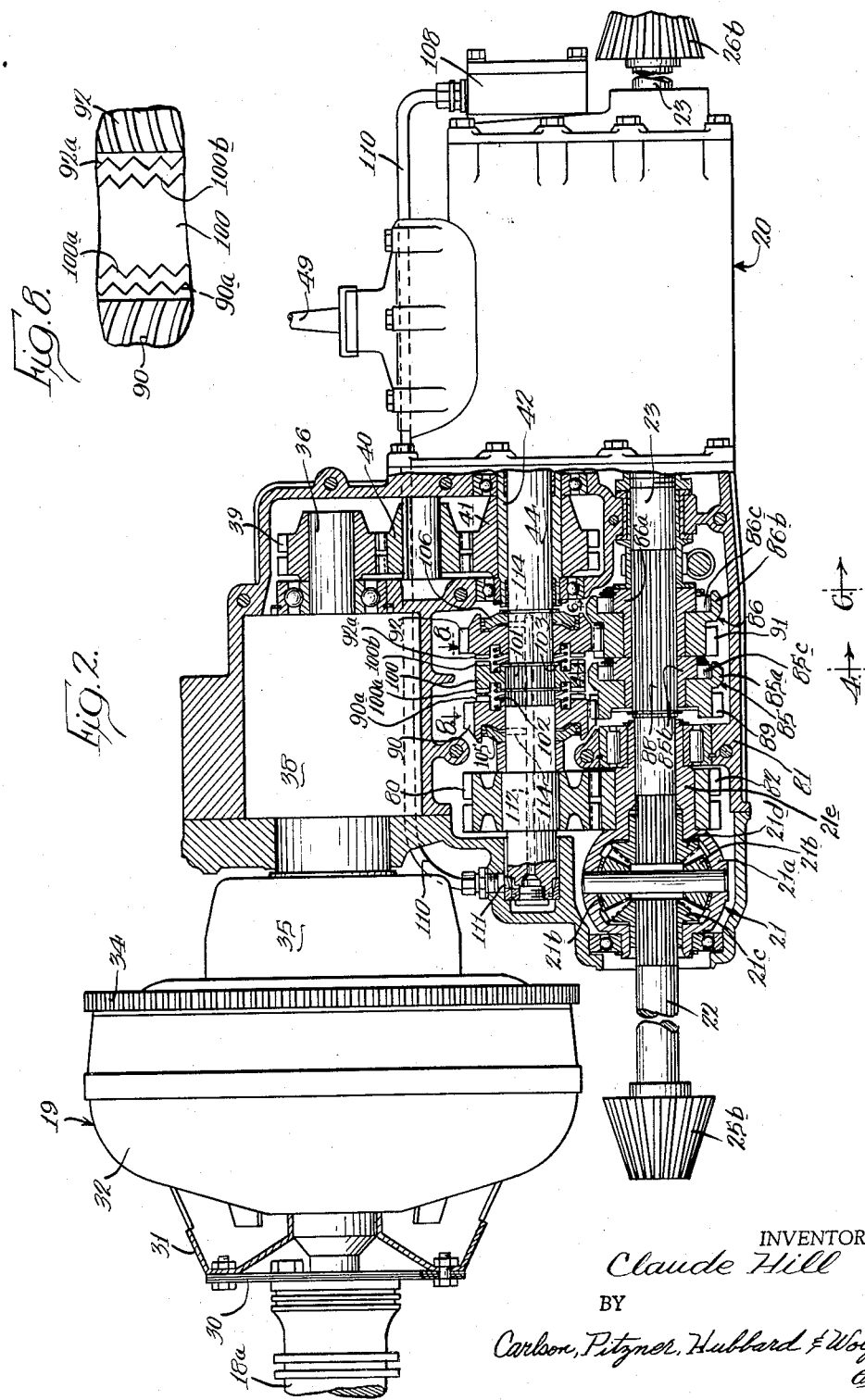

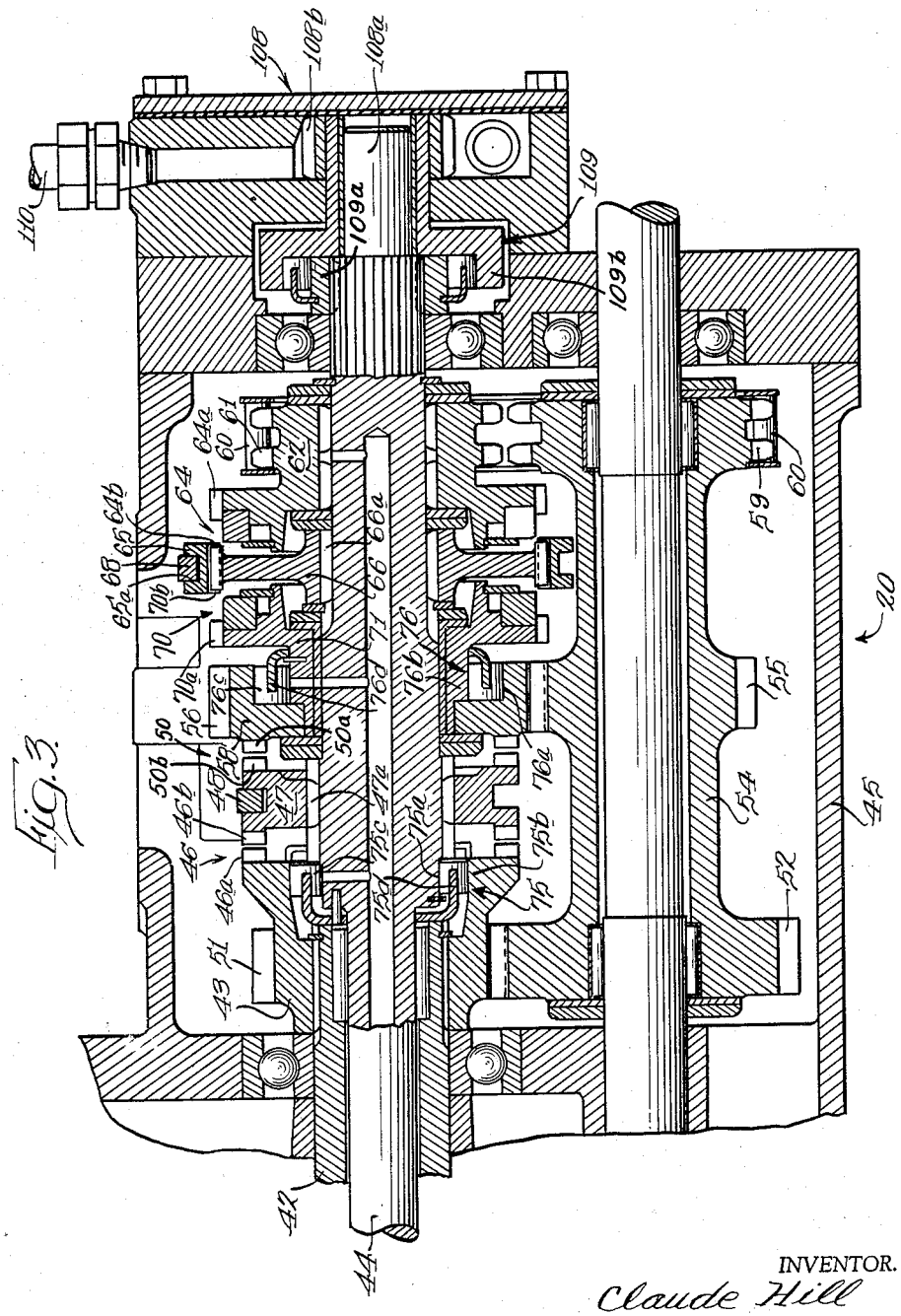

United States Patent Office 2,959,237
Patented Nov. 8, 1960

2,959,237

FOUR WHEEL DRIVE FOR AUTOMOTIVE VEHICLES

Claude Hill, Kenilworth, England, assignor to Harry Ferguson Research Limited, Abbotswood, Stow-on-the-Wold, England, a British company Filed July 19, 1957, Ser. No. 672,916

Claims priority, application Great Britain July 24, 1956

7 Claims. (Cl. 180—44)

The present invention relates in general to automotive vehicles, and in particular to the transmission of power to all four wheels of a vehicle. While the invention may be employed on six or eight wheeled vehicles, it is contemplated that there will be a minimum of four wheels, as on the familiar, present-day automobile.

This invention is directed to improvements in four wheel drives of the genus disclosed and claimed by my U.S. Patent No. 2,796,941. As such, it has many of the same objectives, viz., to provide a "full time" four wheel drive and the traction efficiency which flows from that, yet without requiring any special attention or control on the part of the vehicle operator. Moreover, the drive is one in which circumferential and cornering tire scrub, and the severe wear which they entail, are eliminated, but without loss of all traction if one or two wheels should slip or spin on a slippery surface such as ice or mud.

The present invention has as its general aim to secure even greater advantages than those mentioned above.

An important object of the invention is to provide a four wheel drive system employing one-way overrun devices (simpler and more rugged than two-way overrun devices) which may both be associated with or interposed between the same rotating components and compactly disposed in "side-by-side" relation. This permits a portion of the drive components to be reduced in overall size and simplified in organization.

Another object of the invention is to provide such a four wheel drive in which the difficulty of "locking up" in reverse is automatically eliminated, without any attention on the part of the vehicle operator.

It is a further object of the invention to provide an effective four wheel drive in which the operator may select one of a plurality of forward drive ratios, or forward or reverse directions of movement, simply by manually shifting a control lever, and without having to disengage the drive connection from the engine or prime mover.

An additional object is to provide such a four wheel drive in which the advantageous anti-stalling means are equally effective in any one of a plurality of forward drive speed ratios.

Still another object is to provide a novel speed change and reversing transmission of general utility, particularly characterized in that positive clutches, e.g., having interfitting teeth, employed therein may be engaged or disengaged without breaking the drive connection from the engine or other power source.

Other objects and advantages will become apparent as the following description proceeds, taken in conjunction with the accompanying drawings, in which:

Figure 1 is a schematic perspective view of an automobile which is stripped to reveal the general organization of a four wheel drive embodying the features of the present invention;

Fig. 2 is a side elevation, partly in section, showing that portion of the drive components which is interposed between the engine and front and rear differentials;

Fig. 3 is a longitudinal section of a speed change and reversing transmission embodying certain features of the invention;

Fig. 4 is a sectional view, taken substantially along the line 4—4 in Fig. 2, showing an exemplary one-way overrun device, and with the parts thereof illustrated in their relative positions during overrunning action;

Fig. 5 is a fragmentary view corresponding to Fig. 4, but illustrating the parts of the overrunning device in their locked condition;

Figs. 6 and 7 are sectional views (the former being taken substantially along the line 6—6 in Fig. 2) similar to Figs. 4 and 5, but illustrating one-way overrun device arranged to operate in the opposite sense; and Fig. 8 is a fragmentary plan view taken substantially along the line 8—8 in Fig. 2.

While the invention has been shown and will be described in some detail with reference to a particular embodiment thereof, there is no intention that it thus be limited to such detail. On the contrary, it is intended here to cover all modifications, alterations, and equivalents falling within the spirit and scope of the invention as defined by the appended claims.

Referring now to Fig. 1, a four wheel drive system embodying the advantageous features of the present invention is there shown in connection with only those parts of an automotive vehicle necessary to make clear the environment of its application. The vehicle in this instance includes front and rear pairs of live half axles 10 and 11 carrying front and rear pairs of traction wheels 13 and 14 which are equipped with pneumatic tires. The front wheels 13 are pivoted on the outer ends of their axles 10 for Ackerman type steering action under the control of knuckle arms 15 and tie rods 16 extending to a suitable steering mechanism (not shown). Four wheel brakes are provided, that is, means for braking each half axle. In Fig. 1, brake discs 17 are illustrated on each half axle for cooperating with any suitable form of disc-type brake mechanism (not shown). The vehicle has a prime mover or engine 18 which may be of any type and which supplies power through a torque converter 19, a multi-speed and reversing transmission 20, and thence through the other components of the system to both pairs of wheels 13 and 14.

In this four wheel drive system, a center differential 21, adapted to be driven from the transmission 20, serves to drive both front and rear propeller shafts 22 and 23. The propeller shafts, in turn, are connected to the front and rear pairs of axles 10 and 11 through front and rear differentials 25 and 26, respectively. These latter differentials may be of conventional organization, having ring gears 25a, 26a driven by pinions 25b, 26b on the respective propeller shafts.

Referring now in more detail to Fig. 2, the output shaft 18a, e.g. crankshaft, of the prime mover 18 is connected through a universal coupling which includes a flexible, laminated disc 30 fixed to a bracket 31 welded to a rotary casing 32 for the torque converter 19. This casing is thus driven by the prime mover, and alternatively may be rotated for starting the engine or prime mover by a suitable starter motor (not shown) acting on a ring gear 34 carried by the casing. Because the details of the internal construction of the hydraulic torque converter 19 are not specifically a part of the present invention, they have not been illustrated, and will not be described. Suffice it to say that, in general the hydraulic torque converter 19 may be of any suitable known construction, comprising three vaned elements each rotatable relative to the others, namely, an impeller, a reaction wheel, and a turbine. The reaction wheel is under the control of a free-wheel device (not shown).

As here illustrated, the impeller or input member of the torque converter is not coupled directly to the engine crankshaft 18a, as is the usual practice. Instead, there is interposed between them a speed change gear or "performance gear" capable of transmitting either a direct drive from the engine or a drive at a reduced speed ratio. The reduced speed ratio of the "performance gear" is called into play when it is desired to accelerate the vehicle rapidly, say when passing another vehicle.

Only the housing 35 for the "performance gear" is shown in Fig. 2, since the detailed organization thereof may take any of a variety of well known forms. Simply by way of example, the "performance gear" may be constructed as shown in United Kingdom Patent 601,303. Briefly stated, this performance gear comprises a two-ratio epicyclic gearing arrangement, including within the rotatable housing 35 an outer annulus which is internally toothed, a sun wheel which is an externally-toothed gear wheel, and a number of planet gears journaled on a planet carrier. In such an arrangement, the annulus is the input element and is carried by the housing 35 to be driven from the engine shaft 18a and the casing 32. The planet carrier of the "performance gear" is the output element and is connected to drive the impeller of the torque converter 19. The output element or turbine of the converter 19 is in turn mounted on a shaft 36 which extends centrally through the housing 35 and a control mechanism contained within a stationary casing 38. The control mechanism in the casing 38 includes means for selectively clutching the performance gear annulus to its sun wheel, so that the performance gear provides a direct drive or 1:1 ratio, or for unclutching the sun wheel from the annulus but holding the latter rigid with the stationary casing 38, so that a step-down or speed reduction ratio is interposed in the drive train between the engine shaft 18a and the torque converter 19.

It may be considered, then, that the torque converter 19 and the "performance gear" within the housing 35 constitute a single unit controlled by means within the casing 38, the input of that unit being taken from the output shaft 18a of the prime mover, and the output of that unit being taken from a gear 39 fast on the right end of the shaft 36. Because the prime mover or engine always turns the shaft 18a in the same direction, it will be understood that the shaft 36 and the gear 39 likewise always turn in the same direction.

As shown in Fig. 2, drive from the torque converter unit is supplied as the input to the speed change and reversing transmission 20. This is accomplished by a gear 40 meshed with the troque converter output gear 39, and also meshed with a gear 41 journaled in suitable bearings and rigidly mounted on an input shaft or sleeve 42 for the transmission 20. The latter transmission has an output shaft 44 which is thus driven from the prime mover in either forward or reverse directions, and at a selectable one of a plurality of speed ratios in a forward direction, as will now be explained in detail.

As illustrated more clearly in Fig. 3, the input shaft 42 of the speed change and reversing transmission 20 is sleeve-like in form, being suitably journaled within a housing 45 and disposed for rotation relative to the output shaft 44 which it surrounds. For selectively driving the output shaft 44 from the input shaft 42 at a first speed ratio, means including a first two-element clutch 46 are employed. In the present instance, the clutch 46 is the two-element "positive" type, comprising as its first element axially extending teeth 46a formed on a collar 43 fixed to the end of the input shaft 42. The second element of the clutch 46 is formed by cooperating teeth 46b on a ring 47 splined as at 47a to the shaft 44 with freedom to shift axially under the control of a shifting yoke 48. The latter may be positioned by any suitable linkage (not shown) connecting with a manual control lever 49 (Fig. 2).

Preferably, the positive clutch teeth 46a, 46b, which are engaged or disengaged by axial shifting of the ring 47, are of "saw tooth" configuration, so that they will slide easily into engagement, but then positively lock together. It will be seen that when the two-element clutch 46 is engaged, by shifting of the ring 47 to the left as viewed in Fig. 3, a direct drive is established from the input shaft 42 through the ring 47 and its splined connection to the output shaft 44, the latter thus being driven at a relatively high speed ratio (here 1:1) from the input shaft.

In order to selectively establish forward drive of the output shaft 44 from the input shaft 42 at a second, predetermined speed ratio, means including a second two-element clutch 50 are employed. While such a reduced ratio drive connection may be created in a variety of ways known to those skilled in the art, it is here established by a spur gear 51 formed integrally on the collar 43 which is fixed to the right end of the input shaft 42. The gear 51 constantly meshes with a mating gear 52 formed on a hollow layshaft 54 supported and journaled by any suitable means within the housing 45. The layshaft 54 is thus always driven in the same direction when the input shaft 42 is rotating. Further, the layshaft 54 is formed with a second spur gear 55 continually meshing with mating gear teeth 56 on the outer surface of an annular element 58 which is supported by but journaled for rotation relative to the output shaft 44. The annular element 58 constitutes one element of the clutch 50, having clutch teeth 50a extending axially from its left side and disposed for engagement with mating clutch teeth 50b formed on the right side of the axially shiftable ring 47 which is splined at 47a to the output shaft 44. The clutch teeth 50a, 50b are also preferably of "saw tooth" configuration, so that they will easily slide together but thereafter have positive driving engagement.

When the ring 47 is axially shifted to the right as viewed in Fig. 3 to bring the clutch teeth 50a, 50b into positive engagement, then the clutch 46 is automatically disengaged, and drive torque from the input shaft 42 is transmitted through the gears 51, 52, the gears 55, 56, the clutch teeth 50a, 50b, and thence through the ring 47 to the output shaft 44. By virtue of the relative diameters and numbers of teeth on the mating gears 51, 52 and 55, 56, this drive from the input shaft 42 to the output shaft 44 creates a speed reduction or lower speed ratio, providing a "low" gearing connection for the drive which may be used when it is desired to accelerate the vehicle rapidly, to start it on steep hills, or to brake it through the use of the engine on steep downhill grades.

In order to make it possible to drive the output shaft 44 either forwardly or reversely from the input shaft 42, the layshaft 54 is formed with a sprocket wheel 59 over which is trained an endless chain 60 engaging mating sprocket teeth 61 on an annular member 62. The latter is supported by but journaled for rotation relative to the output shaft 44. Suitable retainers may be employed to prevent the annular member 62 from moving axially relative to the shaft 44.

For selectively locking the member 62 to the output shaft 44 and establishing reverse rotation of the latter, a third "synchromesh" type clutch 64 is provided which includes clutch teeth 64a integrally formed on the member 62 and disposed for selective engagement with mating clutch teeth 64b cut into a ring 65 which is non-rotatably mounted on but axially shiftable relative to a disc 66 splined as at 66a to the output shaft 44. With the ring 65 shifted to the right, and the clutch teeth 64a, 64b engaged, power is transmitted from the input shaft 42 through the gears 51, 52, the layshaft 54, the sprocket wheels and chain 59, 60, 62, and thence through the clutch 64 to the disc 66 and the output shaft 44. By virtue of the chain drive between the sprocket wheels 59 and 62, the output shaft 44 under these conditions turns in the opposite direction, i.e., in "reverse," from that direction in which it is rotated whenever the clutches 46 or 50 are engaged.

The ring 65 may be selectively shifted in an axial direction by any suitable means, and for this purpose it is provided with a slot 65a in its outer surface which receives a shifter yoke 68 connected in any suitable way by a linkage (not shown) to a manual control lever.

For a purpose to be more fully described, a fourth "synchromesh" type clutch 70 is also employed. It is arranged to be complementally actuated with respect to the reverse-drive clutch 64. As here shown, an annular collar or sleeve 71 is supported by but journaled for rotation relative to the output shaft 44, such sleeve partially supporting and journaling the annular element 58 which carries the gear teeth 56. On its periphery, the sleeve 71 is formed with clutch teeth 70a which are adapted for positive driving engagement by clutch teeth 70b formed on the ring 65 and constituting extensions of the previously described clutch teeth 64b. Thus, when the vehicle is not to be driven in reverse, but instead is to be driven in a forward direction, the ring 65 is shifted to the left as viewed in Fig. 3, so that the clutch teeth 70a, 70b engage and thereby drivingly connect the sleeve 71 to the output shaft 44 through the disc 66 and the splines 66a. Under these circumstances, the ring 71 rotates in the same direction and at the same speed as the output shaft 44.

In accordance with one feature of the present invention, means are provided to enable the engagement of the positive clutches 46 or 50 without the necessity of breaking or decoupling the drive connection from the prime mover to the input shaft 42, i.e., without decoupling the drive as by disengagement of a friction type clutch. In accomplishing this, a first overrun device 75 is drivingly interposed between the two elements of the clutch 46, and provided with means for causing that overrun device to lock-up upon a tendency of the output shaft 44 to exceed the first predetermined speed ratio relative to the input shaft 42. In the present instance since the first, highest speed ratio is 1:1, the first overrun device 75 is arranged to positively lock the two clutch elements 46a, 46b and to bring them into synchronism if the output shaft 44 tends to exceed the speed of the input shaft 42. With the clutch elements locked and rotating in synchronism, they may be shifted into mutual engagement without grinding or clashing of teeth.

The first overrun device 75 is of the one-way type. It may take any of a variety of known forms, and as here illustrated has a driver member 75a formed integrally with the output shaft 44 (and thus rotationally fast with the clutch teeth 46b on the ring 47 which is splined to the shaft 44), and has an overrunning member 75b formed integrally on the collar 43 by the inner surface of the radially enlarged end portion of the latter. Interposed between the driver member 75a and the overrunning member 75b are a plurality of rollers 75c which are loosely held in a cage 75d which is fixed to the driver member, i.e., fixed to the output shaft 44.

In a manner which will be more fully explained in connection with Figs. 6 and 7, the operation of the one-way overrun device 75 is such that the overrunning member 75b turns freely with respect to the driver member 75a so long as it rotates at a speed greater than the speed of the driver member 75a. If, however, the driver member 75a should tend to overspeed the overrunning member 75b, then the rollers 75c wedge between the members 75a and 75b to automatically establish a positive connection between the two, so that the input and output shafts 42, 44 are constrained to rotate at the same speed. The clutch teeth 46a, 46b which are rotationally fast to those shafts also are constrained to rotate in synchronism so that those teeth can be easily engaged upon axial shifting of the ring 47.

If the ring 47 is in its neutral position and the automobile coasting in a forward direction with the engine running so that both the input shaft 42 and the output shaft 44 are turning, all that the operator need do in order to engage the clutch 46 without tooth grinding or clash is to let up on the accelerator in order to slow down the engine speed and that of the shaft 42. When the shaft 42 tends to rotate more slowly than the output shaft 44, the overrun device 75 will lock the two together and synchronize the clutch elements 46a, 46b. By manually shifting the ring 47 to the left, as viewed in Fig. 3, the operator may engage those clutch elements without clashing even though the drive connection established from the prime mover through the torque converter and performance gear has not been interrupted.

If the operator of the vehicle should for some reason leave the clutch ring 47 in its neutral position while coasting downhill, the one-way overrun device 75 will be effective to cause the engine to retard or brake the vehicle, since as soon as the output shaft 44 tends to overrun the input shaft 42, the two are locked together automatically.

Further in accordance with the invention, means including a second overrun device 76 are drivingly interposed between the elements of the second clutch 50 in order to lock those elements together and bring them into synchronism upon tendency of the output shaft 44 to turn, relative to the input shaft 42, at a speed ratio lower than the second speed ratio established by the gears 51, 52 and 55, 56.

For this purpose, the overrun device 76 includes an overrunning member 76b which in this instance is formed by a peripheral surface portion of the collar 71. Since in forward drive the clutch 70 will be engaged, the overrunning member 76b is made fast to the clutch element 50b through the disc 66, the splines 66a, the shaft 44, the splines 47a, and the ring 47. Thus, the overrunning member 76b is in effect integral with the first element or set of teeth 50b for the clutch 50.

The overrun device 76 further includes a driver member 76a, in this instance created by an inner surface formed on the element 58 which carries the clutch teeth 50a. As will be explained more clearly with reference to Figs. 4 and 5, the overrun device 76, which includes a plurality of rollers 76c loosely constrained within a cage 76d, permits the overrunning member 76b to turn freely with respect to the drive member 76a so long as the former rotates at a speed exceeding that of the latter. Upon tendency of the driver member 76a to rotate faster than the overrunning member 76b, the two are positively connected together by the rollers 76c.

Assuming that the shiftable ring 47 is in the illustrated neutral position and the vehicle rolling forwardly with the prime mover running so that the transmission input and output shafts 42 and 44 are turning, all the driver need do is to step on the accelerator to "rev up" the prime mover and speed up the input shaft 42. Accordingly, the gear 56 will be increased in speed until the driver member 76a tends to exceed the rotational speed of the overrunning member 76b, whereupon the two will be locked together, and thus will force the clutch elements 50a, 50b to rotate in synchronism. Then, the clutch ring 47 may be shifted to the right in order to bring the clutch teeth 50a, 50b into positive engagement without grinding or clashing.

If during reverse drive the direction of rotation of the shaft 44 were simply reversed, and the overrunning member 76b correspondingly reversed in direction of rotation, this would be tantamount to the overrunning member turning at a much lower or negative speed relative to the driver member 76a. Accordingly, unless some special provision is made, the overrun device 76 would lock up under reverse driving conditions. In the present instance, such locking up is obviated by the third and fourth clutches 64, 70 which are constructed so that they are always complementally actuated, i.e., one engaged when the other is disengaged. Thus, under forward drive conditions, the clutch 70 is engaged so that the sleeve 71 and the overrunning member 76a are rigidly locked to the shaft 44 through the splines 66a. However, when the clutch ring 65 is shifted to the right in order to effect reverse drive, the clutch 70 is disengaged so that the member 71 is free to rotate relative to the output shaft 44, and there is no difficulty with the overrun 76 locking up.

In summary, the speed change and reversing transmission 20 is one in which power taken from the prime mover or engine 18 through the torque converter 19 and the performance gear to the input shaft 42 may be selectively transmitted in a forward direction to the output shaft 44 at either of two speed ratios simply by selectively shifting the clutch ring 47 to engage either the clutch 46 for a relatively high speed ratio of drive, or the clutch 50 for a relatively low speed ratio of drive. No de-coupling, as by disengagement of the friction clutch, is necessary. To shift from "high" to "low," the operator need only shift the ring 47 to a neutral position, then accelerate the engine until the overrun device 76 brings the clutch elements 50, 50a into synchronism, and then shift ring 47 further to the right to engage those clutch teeth. To shift from "low" to "high" drive, the operator need only move the clutch ring 47 to its neutral position, then release the engine accelerator to let the input shaft 42 slow down until the overrun device 75 locks to bring the clutch elements 46a, 46b into synchronism, after which the ring 47 may be shifted to the left to engage those clutch teeth.

The operator may shift to reverse drive simply by bringing the vehicle to a standstill and shifting the clutch ring 65 from its left to its right position as viewed in Fig. 3, the clutching elements being of the "synchromesh" type which will engage even though the sprocket wheel 62 is being rotated by power supplied from the engine. Because shifting of the ring 65 to the "reverse" position also disengages the clutch 70, the overrun device 76 cannot interfere with the reverse driving operation. And because reverse rotation of the output shaft 44 simply constitutes even faster overspeeding of the overrunning member 75b relative to the driver member 75a, the overrun device 75 cannot interfere with reverse driving. Yet, if the clutch ring 47 should happen to be left in a neutral position during downhill descent of the vehicle, braking effort by the engine will nevertheless be exerted because the overrun device 75 will lock the input shaft 42 to the output shaft 44 as soon as the latter tends to overspeed the former.

Referring again to Fig. 2, the output shaft 44 of the transmission 20 is drivingly connected to the input of the center differential 21 which in turn is drivingly connected to the front and rear pairs of ground wheels. As here shown, the center differential 21 includes an intermediate element in the form of a planet carrier 21a supporting and journaling a plurality of planetary gears 21b. The latter mesh with two terminal elements or sun gears 21c and 21d fixed or splined to the opposed ends of the propeller shafts 22 and 23. A spur gear 80 mounted fast on the transmission output shaft 44, which extends into a housing 81, meshes with a mating gear 82 fixed to an extension sleeve 21e of the planet carrier 21a which surrounds but is journaled for rotation relative to the propeller shaft 23. Thus, the shaft 44 and the gear 80 serve to drive the intermediate element or planet carrier 21a of the differential in either direction, and the front and rear terminal elements or sun gears correspondingly drive the front and rear pairs of wheels through the front and rear propeller shafts 22, 23, the front and rear pinions 25b, 26b the front and rear differentials 25, 26 (Fig. 1), and the front and rear pairs of half axles 10 and 11.

The transmission of power to all four wheels through a center differential, and front and rear differentials leaves the individual wheels free to turn at different rotational speeds so that upon rounding a corner the outermost wheels (which run through an arc of greater radius) may turn faster than the innermost wheels without causing "scrubbing" of the tires. Likewise, if due to differences in inflation or loading, the circumferences of the different tires are not exactly equal, the individual wheels have freedom to rotate at different angular speeds in traversing the same linear distances, so that the tires are subjected to damaging scraping or scrubbing. However, the serious difficulty is imposed in such a three-differential drive that if one or two wheels should lose traction and spin as on a slippery surface such as ice or mud, then no torque is transmitted to any of the other wheels. That is, if the left rear wheel should slip and spin, the rear differential 26a would leave the right rear wheel motionless, and the center differential would permit the rear propeller shaft 23 to speed up, without supplying torque to the front propeller shaft 22 and the front wheels.

This problem is obviated by the present invention in a particularly advantageous manner, employing two one-way overrun devices which may be compactly disposed in "side-by-side" relation. As previously seen, the output shaft 44 of the transmission 20 is a rotatable member which can be selectively driven in either direction. In carrying out the present invention, a first one-way overrun device 85 is drivingly connected between one of the two propeller shafts (here the shaft 23) and the output shaft 44; while a second overrun device 86 is likewise drivingly interposed between the common propeller shaft 23 and the output shaft 44. The two overrun devices and the drive connections to them are constructed and arranged such that they operate in opposite senses, i.e., the device 85 slips freely unless the propeller shaft 23 turns slower, by more than a predetermined percentage, than the output shaft 44; while the device 86 is arranged to slip freely unless the propeller shaft 23 turns faster, by more than a predetermined percentage, than the output shaft 44.

As here shown, the overrun devices 85 and 86 are disposed in side-by-side relation and both drivingly interposed between the shaft 44 and the common propeller shaft 23. The overrun device 85 has an overrunning member 85b connected, as by splines shown at 88, to the propeller shaft 23. The driver member 85a of the device 85 is journaled on, and rotatable relative to, a collar integral with the overrunning member 85b, and is drivingly connected to the reversible output shaft 44 by virtue of helical gear teeth 89 formed on its outer periphery and matingly engaged with a helical gear 90 rotatable on the shaft 44. In distinction, the other overrun device 86 is so constructed that its innermost member 86a, which is connected to the propeller shaft 23 by the splines 88, is its driver member. The outer element 86b is the overrunning member and is journaled on a collar of the member 86a. The overrunning member 85b is drivingly connected with the shaft 44 by virtue of helical gear teeth 91 formed on its outer periphery and meshed with a mating gear 92 rotatable on the shaft 44.

The speed ratios afforded by the mating gears 80, 82 and the gears 89, 90 and 91, 92 are chosen such that when the planet carrier 21a and the sun gear 21d are rotating at the same speeds, i.e., the differential 21 is not "working" and the planet gears 21b are not rotating about their individual axes, then the two overrunning elements 85b, 86b turn faster than their corresponding driver elements 85a, 86a by predetermined percentages. To accomplish this in the present instance, the gears 89, 90 are constructed with diameters such that there is a speed reduction in the drive of the gear 89 from the shaft 44; while the gears 91, 92 are made of such relative diameters that there is a speed step-up in the drive of the gear 91 from the shaft 44. It will be apparent, however, that when the center differential 21 "works" due to slippage of the front wheels and speed-up of the front propeller shaft 22, the rear propeller shaft 23 will slow down relative to the planet carrier 21a and the reversible shaft 44. On the other hand, if one or both the rear wheels should slip and spin causing the differential 21 to "work," the rear propeller shaft 23 will speed up relative to the planet carrier 21a and the reversible shaft 44. If in the first instance the propeller shaft 23 slows down sufficiently that the driver member 85a tends to turn faster than the overrunning member 85b, the device 85 will lock and limit the degree to which the planet carrier 21a can differ in speed from the sun wheel 21d. If in the second instance the propeller shaft 23 speeds up sufficiently that the driver member 86a tends to turn faster than the overrunning member 86b, the device 86 will lock and limit the degree to which the planet carrier can differ in speed relative to the sun wheel 21d. In both cases, therefore, the degree of freedom for the differential 21 is limited, and one propeller shaft can never spin while leaving the other motionless.

This may be better understood with reference to Figs. 4 and 5 which are cross sectional illustrations of the overrun device 85. As there shown, the overrunning member 85b is formed with a peripheral surface made up of a plurality of flats or chords 85b', while the driver member 85a circumferentially surrounds the overrunning member and is provided with a smooth, cylindrical internal surface 85a'. A plurality of rollers 85c are disposed between the overrunning and driver elements and are loosely held with freedom to shift slightly circumferentially by a cage 85d fixed to and rotating with overrunning member 85b. The rollers 85c are of a diameter such that when they are disposed in the mid-portions of the flats or chords 85b', they have sufficient clearance to spin or slip freely between the chord surfaces and the cylindrical inner surface 85a'. However, if the rollers are shifted to a point near the edge of their chord surfaces, then they wedge to transmit torque from the driver member to the overrunning member.

It will be seen from Fig. 4 that if the overrunning member 85b is turning faster than the driver member 85a, then the fingers of the cage 85d each engage a corresponding one of the rollers 85c and shift the latter to a position near the mid-portion of its corresponding flat or chord surface 85b'. Therefore, the rollers 85c can spin idly, and leave the driver member 85a free of the faster rotating overrunning member 85b. If the conditions are reversed, as illustrated in Fig. 5, so that the overrunning member 85b tends to rotate more slowly than the driver member 85a, the faster turning driver member tends to shift each of the rollers 85c toward the edge of its corresponding flat or chord surface 85b'. This shifting in the positions of the rollers 85c relative to their chord surfaces proceeds until the rollers positively wedge between the chord surfaces 85b' and the opposite cylindrical surface 85a', so that the driver member 85a transmits torque through the rollers to the overrunning member 85b.

With this in mind, it will be readily perceived that when the propeller shaft 23 (Fig. 2) slows down sufficiently such that the driver member 85a of the device 85 tends to rotate faster than the overrunning member 85b, a positive drive connection is established from the propeller shaft 23 through the overrun device 85, the gears 89, 90 and the gears 80, 82 to the planet carrier 21a. This effectively connects the planet carrier 21a and the sun wheel 21d together so that they cannot have more than a predetermined difference in rotational speeds.

The overrun device 76 shown in Fig. 2 is constructed essentially like the overrun device 85 (Figs. 2, 4 and 5) so that the foregoing detailed description of the operation of the latter applies also to the former.

The overrun device 86 is fragmentarily illustrated in detail by Figs. 6 and 7. It is constructed in general like the device 85 except that it is "reversed." Thus, the device 86 includes an inner driver member 86a formed with chord surfaces 86a', and an outer overrunning member 86b having a cylindrical surface 86b'. The cage 86d which holds the rollers 86c loosely captive is fixed to the inner driver member 86a with a slightly different angular relation. For example, as viewed in Fig. 6, when the outer, overrunning member 86b is turning faster than the inner driver member 86a, the slight frictional drag of the rollers 86c on the inner surface 86b' shifts those rollers toward the mid-portions of the flat or chord surfaces 86a'. Such shifting of the rollers is limited by engagement with their corresponding fingers on the cage 86d. With the rollers thus centered, the outer, overrunning member 86b can freely turn at a faster speed than the inner driver member 86a. However, as illustrated in Fig. 7, if the inner member 86a tends to rotate faster than the outer member 86b, then the rollers 86c shift retrogressively away from the centers of their flat or chord surfaces 85a', thus wedging between those surfaces and the inner cylindrical surface 86b'. Under these circumstances, therefore, when the inner driver member 86a tends to turn faster than the outer overrunning member 86b, the rollers 86c positively transmit torque from the former to the latter.

The foregoing detailed explanation also applies to the overrun device 75 (Fig. 3), which is substantially identical to the device 86 (Figs. 2, 6 and 7).

It will therefore be understood with reference to Fig. 2 that when the propeller shaft 23 speeds up by more than a predetermined percentage relative to the shaft 44, the inner driver member 86a is positively connected by the rollers 86c to the overrunning member 86b. Under these circumstances, therefore, the propeller shaft 23 and the sun gear 21d splined thereto are connected to the planet carrier 21a through the device 86, the gears 91, 92, and 80, 82. This positively limits the difference in the speeds of the planet carrier 21a and the sun gear 21d.

In over-all operation, the arrangement described permits the vehicle wheels to rotate at different speeds up to the degree necessary to accommodate cornering or differences in wheel radii without tire scrub. But if any wheel slips and spins freely on ice or mud, the others are not left dead.

If one or both front wheels should lose traction and tend to spin, the propeller shaft 22 would tend to speed up, and the propeller shaft 23 to slow down, relative to the planet carrier 21a and the shaft 44. But if this slowing down of the propeller shaft 23 exceeds a certain percentage, so that the driver member 85a tends to turn faster than the overrunning member 85b, the device 85 locks, and thus assures that both the propeller shafts must rotate. Torque is transmitted through the rear propeller shaft 23 to the rear wheels. The vehicle is not stalled despite slippage of the front wheels.

If one or both rear wheels should slip and spin, the propeller shaft 23 will speed up, and the propeller shaft 22 slow down, relative to the planet carrier 21a and the shaft 44. In fact, the front shaft 22 would tend to remain motionless. But as soon as the rear shaft 23 speeds up sufficiently to cause the driver member 86a to tend to overspeed the overrunning member 86b, the device 86 locks and limits the "working" of the differential 21. Torque is transmitted to the front propeller shaft 22 and the front wheels, so the vehicle is not stalled despite slippage of the rear wheels.

It is important to realize that the foregoing operation is obtained regardless of the particular speed ratio selected by shifting of the transmission 20. That is, the automatic safety action of the overrun devices 85 and 86 to prevent stalling of the vehicle occurs whenever the shaft 23 speeds up or slows down by more than predetermined percentages relative to the shaft 44, irrespective of whether the transmission 20 is in "high" or "low."

The action of the one-way overrun devices enhances the operation and safety of the vehicle brakes. For example, if in applying the brakes, one of the wheels hits a slippery surface so that its corresponding brake locks and the wheel simply skids, the particular brake associated with that wheel would, in a simple three differential drive, contribute very little to the over-all braking effort. That is, the brake disc and its corresponding brake shoes, absent the provisions here made, would not be forced to rotate relative to one another, and thus would create no friction which contributes to the entire braking effort.

Assume, by way of example, that one of the front wheels 13 hits a slippery surface and skids during braking, while the other wheels maintain good traction. This will tend to cause the front drive shaft 22 to be reduced in speed by 50 percent. However, such reduction of speed could only occur if the center differential 21, by rotation of the planet gears about their respective axes, had a high degree of differential action; and such high degree of differential action cannot occur because the rear drive shaft 23 tends to speed up relative to the output shaft 44 to the extent that the overrun device 86 locks, positively limiting the amount of differential action. Thus, assuming that the rear wheels maintain full road grip, the effect will be that the skidding wheel will be forced to rotate, causing frictional drag between the brake disc and shoe associated therewith. The braking effort of the brake disc and shoe associated with the skidding wheel will thus be transferred to the rear wheels.

Even though one wheel loses traction and its brake tends to lock, the retarding effect of all four brakes is still available and is applied through the remaining three wheels. The same action will take place in the event of a rear wheel tending to skid on a slippery surface during braking, except that the overrun device 85 in that instance will lock so that the effort of the brake associated with the skidding wheel will be transferred to the remaining three wheels.

The use of two one-way overrun devices which are drivingly interposed between a single one of the two propeller shafts and a reversible rotating member, such as the shaft 44, contributes to the simplicity and compactness of the arrangement of components shown in Fig. 2, and effectively assures that there will be a real four wheel drive under all conditions of operation, yet with sufficient differential freedom of the respective wheels to eliminate cornering and circumferential scrub. However, when the vehicle is driven in the reverse direction, both of the overrun devices 85 and 86 would tend to lock immediately, since under those conditions the gearing would tend to turn the driver members 85a, 86a at faster speeds than their corresponding overrunning members 85b, 86b.

This difficulty is overcome, in accordance with the present invention, by providing for means to disengage automatically the drive connection of the two overrunning devices between the propeller shaft 23 and the shaft 44 whenever the vehicle is put into reverse.

As a first means to this end, disengageable clutch elements are employed in the means which drivingly interpose the overrun devices between the shafts 23 and 44.

As here shown, the gears 90 and 92 are journaled on and rotatable relative to the output shaft 44, but are adapted to be selectively clutched to that shaft. A clutching ring 100 is rotationally fixed or splined as at 101 to the shaft 44. Further, the gears 90, 92 are formed with clutch teeth 90a, 92a, respectively, disposed opposite mating clutch teeth 100a, 100b formed on the ring 100. The clutch ring 100 is axially fixed to the shaft 44 by suitable retainers, while the gears 90 and 92 have freedom for limited axial shifting relative to the shaft 44. The gears 90 and 92 are normally urged axially away from the clutch ring 100 to separate the clutch teeth 90a, 100a and 92a, 100b by suitable compression springs 102 and 103 so that in the absence of any actuating force, the clutches are disengaged and the gears 90, 92 can turn freely relative to the shaft 44.

To assure that the clutch teeth 90a, 100a and 92a, 100b will be brought into engagement whenever the vehicle is in forward drive, flanges 105 and 106 are mounted axially fast on the shaft 44 and disposed relative to axial lips on those gears to define internal cavities which may be viewed as hydraulic cylinders. Means are provided to introduce pressure fluid into those cavities so as to shift the gears 90 and 92 axially inward toward the clutch ring 100 whenever the vehicle is being driven forwardly. Such means in the present instance take the form of a pump 108 (Figs. 2 and 3) having its shaft 108a and impeller 108b connected to be driven by the shaft 44 through a one-way overrun device 109. The device 109 is arranged to transmit torque to the pump impeller only when the shaft 44 is rotating in a direction to drive the vehicle forwardly, and for this purpose has its driver member 109a splined to the shaft 44 and its overrunning member 109b splined to the pump shaft 108a.

When the vehicle is in forward drive and the pump 108 is driven from the shaft 44, fluid pressure is supplied through a conduit 110 and a rotational coupling 111 to a passage 112 within the left end of the shaft 44 (Fig. 2). Leading from the passage 112 to the interior of the "cylinders" are two small openings 114 so that pressure fluid created by the pump can enter and force the gears 90, 92 axially inward against the biasing action of the springs 102 and 103. This brings the clutch teeth 90a, 100a and 92a, 100b, which preferably are of serrated or "saw tooth" configuration for ease of engagement, into positive locking fit. The gears 90 and 92 are thus made rotationally rigid with the shaft 44 by virtue of clutch connections to the ring 100 splined to that shaft.

On the other hand, when the vehicle is put into reverse drive so that the shaft 44 turns in the opposite sense, the one-way overrun device 109 slips freely and leaves the pump shaft 108a idle so that no fluid pressure is created in the conduits 110 and 112. Under these circumstances, the compression springs 102 and 103 force the gears 90 and 92 axially away from the clutch ring 100, disengaging the respective clutch teeth. Therefore, the drive means connecting the two overrun devices 85 and 86 between the propeller shaft 23 and the shaft 44 is interrupted automatically.

In order to facilitate the axial movements of the gears 90 and 92 in response to the application or removal of fluid pressure in the cavities between the flanges 105 and 106 and those gears, the teeth on the gears 90, 89 and 92, 91 are preferably made helical in configuration so that by virtue of their relative rotation there is created a "threading" action which aids either in the engagement or disengagement of the clutch teeth. For example, if the gears 90 and 92 are de-clutched from the ring 100, and the shaft 24 driven in a forward direction, any tendency of the gears 90 and 92 to rotate with the shaft 44 causes the threads on the mating gears 90, 89 and 92, 91 to "screw" the gears 90 and 92 inwardly toward the clutch ring 100. This assists the hydraulic pressure in bringing the clutch teeth 90a, 100a and 92a, 100b into engagement. Conversely, if those clutch teeth are engaged and the transmission 20 shifted to reverse the rotation of the shaft 44, any tendency of the gears 90, 92 to rotate in the opposite direction along with the shaft 44 results in an "unscrewing" action by the helical gear teeth, aiding the springs 102 and 103 in axially separating the gears 90 and 92 from the clutch ring 100. A pump which supplies pressure only when the vehicle is being driven forwardly, and the helical formation of the gear teeth both contribute to smooth, automatic engagement and disengagement of the clutch means which establish a drive connection of the overrun devices between the propeller shaft 23 and the transmission shaft 44 only when the vehicle is in forward drive.

Such automatic de-clutching or disconnection of the overrun devices 85 and 86 eliminates lock-up in reverse drive. While it thus disables the overrun devices during reverse driving, this is not a serious drawback because reverse drive will not often be used under conditions where one or more wheels are likely to spin.

I claim as my invention:

1. In a vehicle having a prime mover and front and rear pairs of ground wheels, an improved four wheel drive comprising, in combination, a speed change transmission having an input shaft driven from the prime mover and having an output shaft, first and second two element clutches, means drivingly connecting said first clutch operatively disposed between said input shaft and said output shaft with a first speed change ratio, means drivingly connecting said second clutch operatively disposed between said output and said input shaft with a second speed change ratio which is lower than said first ratio, a first overrun device, means drivingly connecting said first overrun device between the elements of said first clutch for locking such elements together upon tendency of the speed of said output shaft to exceed said first speed change ratio relative to said input shaft, a second overrun device, means drivingly connecting said second overrun device between the elements of said second clutch for locking such elements together upon tendency of said output shaft to fall below said second speed change ratio relative to said input shaft, means for selectively driving said output shaft in a reverse direction from said input shaft, means for disabling said second overrun device in response to said output shaft being reversely driven by said last-named means, a differential having an intermediate element drivingly connected to said output shaft and having two terminal elements, two propeller shafts drivingly connected between respective ones of said terminal elements and the front and rear pairs of wheels respectively, third and fourth one-way overrun devices, means drivingly interconnecting said third and fourth devices to said output shaft and to a common one of said propeller shafts, said interconnecting means including means for causing said third and fourth devices to respectively lock if said one propeller shaft slows down or speeds up by predetermined percentages relative to said output shaft, and means for automatically disabling said interconnecting means when the vehicle is driven in reverse.

2. In a vehicle having a prime mover and front and rear pairs of ground wheels, an improved four wheel drive comprising, in combination, a speed change and reversing transmission having an input shaft driven by the prime mover and having an output shaft, a first clutch having first and second relatively shiftable elements, means drivingly connecting said first and second elements of said first clutch respectively to said input and output shafts for disengageably driving the latter with a first speed ratio from the former, a first one-way overrun device having a driver member and an overrunning member, means drivingly connecting said driver member and overrunning member respectively to said second and first elements of said first clutch to limit relative rotation of such first and second elements upon tendency of the second such element to overspeed the first such element, a second clutch having first and second relatively shiftable elements, means drivingly connecting said first and second elements of said second clutch respectively to said output and input shafts for disengageably driving the former with a second, lower speed ratio from the latter, a second one-way overrun device having a driver member and an overrunning member, means drivingly connecting said second driver member with the second element of the second clutch, a third disengageable clutch, means drivingly connecting said third clutch operatively disposed between said second overrunning member and the first element of the second clutch and with a ratio which makes said second device lock the first and second elements of the second clutch upon tendency of the second element to overrun the first element, means including a fourth clutch drivingly interposed between said input and said output shaft for selectively driving the latter in a reverse sense from said input shaft, means for complementally controlling said third and fourth clutches, a differential having an intermediate element and two terminal elements, means drivingly connecting said output shaft and said intermediate element, two propeller shafts and means drivingly connecting them respectively between said two terminal elements and said two pairs of wheels, third and fourth one-way overrun devices each having a driver element and an overrunning element, means drivingly connecting both said third and fourth devices between said output shaft and a common one of said propeller shafts, said last means including speed change means for causing said third and fourth devices to lock in response to a tendency of said one propeller shaft to overspeed or underspeed, respectively, said output shaft by more than predetermined percentages, said last-named connecting means also including two hydraulically actuated clutches, a pump driven by said output shaft, and means for causing said pump to supply hydraulic pressure fluid to actuate said clutches only when the vehicle is driven in a forward direction.

3. In a vehicle having a prime mover and front and rear pairs of ground wheels, and a four wheel drive which includes a rotatable member driven from the prime mover, a differential having first and second terminal elements and having an intermediate element which is driven from said rotatable member, and front and rear propeller shafts drivingly interposed between said first and second terminal elements and said front and rear pairs of wheels, respectively; that improvement which comprises first and second one-way overrun devices each having a driver member and an overrunning member, first and second means respectively drivingly connecting the overrunning member of said first device and the driver member of said second device to said rotatable member, third and fourth means respectively drivingly connecting the driver member of said first device and the overrunning member of said second device to a common one of said propeller shafts, and said last four connecting means including means having drive ratios for causing said first and second overrun devices to lock if said one propeller shaft slows down or speeds up, respectively, by predetermined percentages relative to said rotatable member.

4. In a vehicle having a prime mover and front and rear pairs of ground wheels, and a four wheel drive which includes a rotatable shaft and means for driving the same optionally in either direction from the prime mover, a differential having an intermediate element and means for driving the same from said rotatable shaft, said differential having two terminal elements, means including two propeller shafts drivingly connecting said terminal elements to the front and rear pairs of wheels, respectively; that improvement which comprises first and second one-way overrun devices each having a driver member and an overrunning member, first and second means respectively drivingly connecting the overrunning member of said first device and the driver member of said second device to said rotatable shaft, third and fourth means respectively drivingly connecting the driver member of said first device and the overrunning member of said second device to a common one of said two propeller shafts, said last-named four connecting means including means having drive ratios for making said first and second overrun devices lock only if said one propeller shaft speeds up or slows down by predetermined percentages, respectively, from its normal speed relationship with said intermediate element when said shaft is driven in one direction, and means for automatically interrupting one of said first and third connecting means and one of said second and fourth connecting means when said shaft is driven in the opposite direction.

5. In a vehicle having a prime mover and front and rear pairs of ground wheels, and a four wheel drive which includes a reversible transmission driven from the prime mover and having an output shaft selectively driven in opposite directions, a differential having an intermediate element driven from said output shaft and having two terminal elements, and front and rear propeller shafts drivingly interposed respectively between said terminal elements and said pairs of ground wheels; that improvement which comprises two one-way overrun devices each having a driver member and an overrunning member, first and second means respectively drivingly connecting the overrunning member of said first device and the driver member of said second device to said output shaft, third and fourth means respectively drivingly connecting the driver member of said first device and the overrunning member of said second device to a common one of said propeller shafts, said last-named four connecting means including means having drive ratios for causing said first and second devices to lock only if said one propeller shaft speeds up or slows down by predetermined percentages, respectively, from their normal speed ratios relative to said intermediate element when said output shaft is turning in that direction which drives the vehicle forwardly, one of said first and third connecting means including a first hydraulically actuated clutch, one of said second and fourth connecting means including a second hydraulically actuated clutch, and means including a pump driven by said output shaft for automatically engaging and disengaging said clutches when the vehicle is driven forwardly and reversely, respectively.

6. In a vehicle having a prime mover and front and rear pairs of ground wheels, and a four wheel drive which includes a reversible transmission driven from the prime mover and having an output shaft selectively driven in forward or reverse directions, a differential having an intermediate element driven from said output shaft and having two terminal elements, and front and rear propeller shafts drivingly interposed respectively between said terminal elements and said pairs of ground wheels, one of said propeller shafts being disposed in spaced parallelism relative to said output shaft; that improvement which comprises two one-way overrun devices disposed in side-by-side relation and concentrically about said one propeller shaft, each said overrun device having an inner member fixed to said one propeller shaft and an outer member formed with external helical gear teeth, a pair of helically toothed gears journaled on and axially movable relative to said output shaft and meshing with the teeth of said two respective outer members, axially extending clutch teeth on each of said gears and mating clutch teeth rigid with said output shaft, means for automatically shifting said gears axially to engage or disengage said clutch teeth as an incident to rotation of said output shaft in forward and reverse directions, respectively, said helical gear teeth on the outer members of said overrun devices and on said gears being constructed and arranged to create a threading action which assists the axial movement of said gears.

7. The combination set forth in claim 3 further characterized in that said rotatable member is driven from a prime mover optionally in first or second directions and further including means for preventing locking of said first and second overrun devices when said rotatable member is driven in said second direction.

References Cited in the file of this patent
UNITED STATES PATENTS

| | | |
|---|---|---|
| 2,090,123 | Hoffman | Aug. 17, 1937 |
| 2,176,138 | Kelley | Oct. 17, 1939 |
| 2,394,580 | Banker | Feb. 12, 1946 |
| 2,567,446 | Polomksi | Sept. 11, 1951 |
| 2,609,702 | Rogers | Sept. 9, 1952 |
| 2,777,332 | Nallinger | Jan. 15, 1957 |
| 2,796,941 | Hill | June 25, 1957 |
| 2,796,942 | Hill | June 25, 1957 |
| 2,855,788 | Mount | Oct. 14, 1958 |